United States Patent
Leblanc et al.

(10) Patent No.: US 9,623,456 B2
(45) Date of Patent: Apr. 18, 2017

(54) MOBILE SOIL TREATMENT UNIT

(71) Applicant: Sanexen Environmental Services Inc., Brossard (CA)

(72) Inventors: Éric Leblanc, Mont-Saint-Hilaire (CA); Jean-François Larose, St-Amable (CA); Karl Côté, Montréal (CA); Élaine Lacoste, Montréal (CA); Sylvain Laberge, Ste-Martine (CA)

(73) Assignee: Sanexen Environmental Services, Inc., Brossard (CA)

( * ) Notice: Subject to any disclaimer, the term of this patent is extended or adjusted under 35 U.S.C. 154(b) by 87 days.

(21) Appl. No.: 14/530,880

(22) Filed: Nov. 3, 2014

(65) Prior Publication Data
US 2016/0121379 A1    May 5, 2016

(51) Int. Cl.
*B09C 1/00* (2006.01)
*B09C 1/02* (2006.01)
*B08B 5/00* (2006.01)

(52) U.S. Cl.
CPC .............. *B09C 1/002* (2013.01); *B09C 1/005* (2013.01); *B09C 2101/00* (2013.01)

(58) Field of Classification Search
CPC B09C 1/00; B09C 1/002; B09C 1/005; B09C 2101/00; C02F 3/046; C02F 2203/0082
USPC .................. 405/128.1–128.85; 210/241, 610
See application file for complete search history.

(56) References Cited

U.S. PATENT DOCUMENTS

| | | | | |
|---|---|---|---|---|
| 5,325,795 A * | 7/1994 | Nelson | ...... | B09C 1/06 110/204 |
| 5,688,076 A * | 11/1997 | Atkins | ...... | B01D 17/0205 166/267 |
| 5,804,434 A * | 9/1998 | Cash | ...... | B09C 1/005 405/128.8 |
| 5,969,501 A * | 10/1999 | Glidden | ...... | F24J 2/523 320/101 |
| 6,447,207 B1 * | 9/2002 | Ivey | ...... | B09C 1/002 405/128.25 |
| 7,410,576 B2 * | 8/2008 | Brouillard | ...... | B01D 29/23 210/241 |
| 2003/0147697 A1 * | 8/2003 | Brady | ...... | B09C 1/06 405/128.15 |
| 2008/0175670 A1 * | 7/2008 | Richter | ...... | B09C 1/06 405/128.4 |
| 2012/0313569 A1 * | 12/2012 | Curran | ...... | F24J 2/523 320/101 |
| 2014/0321917 A1 * | 10/2014 | Brady | ...... | B09C 1/06 405/128.85 |
| 2015/0078829 A1 * | 3/2015 | Brady | ...... | B09C 1/06 405/128.85 |

* cited by examiner

*Primary Examiner* — Frederick L Lagman
*Assistant Examiner* — Stacy Warren
(74) *Attorney, Agent, or Firm* — Reed Smith LLP

(57) ABSTRACT

A modular soil treatment system and apparatus for treating soils contaminated by petroleum hydrocarbons such as gasoline, diesel and heating oil, chlorinated hydrocarbons and volatile organic compounds is disclosed which can be transported to any site and reused.

10 Claims, 8 Drawing Sheets

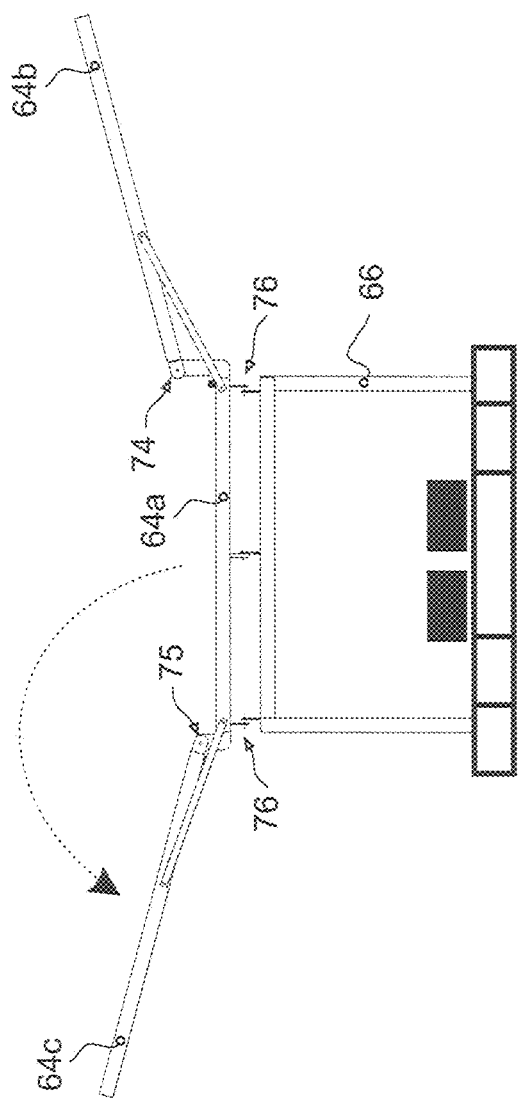

MOBILE SOIL TREATMENT UNIT

FIELD OF THE INVENTION

The present invention relates to the field of contaminated soil treatment and more specifically to a system and apparatus for treating soils contaminated by petroleum hydrocarbons such as gasoline, diesel and heating oil and soils contaminated by chlorinated hydrocarbons and volatile organic compounds.

BACKGROUND OF THE INVENTION

The standard system used today for treating soils contaminated by petroleum hydrocarbons are known as biopiles. Biopiles, also known as biocells, bioheaps, biomounds, and compost piles, are used to reduce concentrations of petroleum hydrocarbons in excavated soils through the use of biodegradation. This technology involves heaping contaminated soils into piles (or "cells") and stimulating aerobic microbial activity within the soils through the aeration and addition of minerals, nutrients, and moisture. The enhanced microbial activity results in degradation of adsorbed petroleum-product constituents through microbial respiration.

Biopiles are similar to landfarms in that they are both above-ground, engineered systems that use oxygen, generally from air, to stimulate the growth and reproduction of aerobic bacteria which, in turn, degrade the petroleum hydrocarbons adsorbed in the soil. While landfarms are aerated by tilling or plowing, biopiles are aerated by forcing air to move by injection or extraction through slotted or perforated piping placed throughout the pile.

Biopiles have been proven effective in reducing concentrations of nearly all the constituents of petroleum products typically found at storage tank sites. Lighter (more volatile) petroleum products like gasoline tend to be removed by evaporation during aeration processes (i.e., air injection, air extraction, or pile turning) and, to a lesser extent, degraded by microbial respiration. The mid-range hydrocarbon products (e.g., diesel fuel, kerosene) contain lower percentages of lighter (more volatile) constituents than does gasoline. Biodegradation of these petroleum products is more significant than evaporation. Heavier (non-volatile) petroleum products (e.g., heating oil, lubricating oils) do not evaporate during biopile aeration; the dominant mechanism that breaks down these petroleum products is biodegradation.

The typical height of biopiles varies between 3 and 10 feet. Additional land area around the biopile will be required for sloping the sides of the pile, for containment berms, and for access. The length and width of biopiles is generally not restricted unless aeration is to occur by manually turning the soils. In general, biopiles which will be turned should not exceed 6 to 8 feet in width. To prevent possible leaching of contaminants from the biopile into the underlying groundwater, biopiles require to be constructed on top of an impermeable liner. Leachate that drains from the biopile is then collected for treatment and disposal. Biopiles are also typically covered by a semi-permeable liner to allow air circulation but minimize infiltration of excess water from precipitation.

Because volatile constituents tend to evaporate from the biopile into the air during extraction or injection, rather than being biodegraded by bacteria, capture or containment of vapors is required. If air is extracted from the pile by applying a vacuum to the aeration piping, volatile constituent vapors will pass into the extracted air stream which can be treated typically through a biofilter and/or carbon adsorption. Hair is injected into the pile, from the bottom up, extraction piping on top of the pile will recover the volatiles for treatment by filtration.

Biopile construction is an effective method for treating large amounts of contaminated soils. However biopile construction is less adapted for treating smaller amounts of contaminated soils as it requires heavy machinery to build up the biopile and install piping and requires trained personnel for the aeration process and the addition of minerals, nutrients, and moisture and to monitor the biopile sites. Temporary and project-specific biopiles are usually underlain by a fragile geomembrane liner which will typically not be reused on another biopile project. Bottom piping is also subject to damage from heavy equipment during soil mixing operations and will typically not be reused on another biopile project. At permanent soil biotreatment facilities the bottom surface is typically constructed of concrete which may be costly. For small or medium size spills in small communities or remote communities, biopile construction, maintenance and monitoring is an expensive proposition and is often not feasible for lack of equipment, materials and trained personnel.

Therefore, there is a need for a system and apparatus for treating soils contaminated by petroleum hydrocarbons such as gasoline, diesel and heating oil and soils contaminated by chlorinated hydrocarbons and volatile organic compounds which adapted for small or medium size spills in small communities or remote communities.

SUMMARY OF THE INVENTION

It is an object of the present invention to improve at least some of the inconveniences present in the prior art.

In one aspect, the invention provides a sturdy steel structure on the bottom (and on all 4 sides) allowing for reuse of bottom piping and preventing floor damage and release of contaminants from the unit.

In an additional aspect, the invention provides a mobile treatment unit that can easily be transported from one spill site to another or from a spill site to a treatment area where power is available.

In another aspect, the invention provides a modular soil treatment apparatus comprising a steel container having a floor and sides adapted to hold a quantity of contaminated soil; at least one air circulating section positioned on the floor of the steel container and extending the length of the steel container, the least one air circulating section including an air extraction pipe positioned underneath a protective perforated steel plate; an air-water separator positioned outside the steel container and connected to the air extraction pipe; a vacuum blower connected to the air-water separator; and an air filter connected to the vacuum blower.

In a further aspect, the invention provides a modular soil treatment apparatus comprising a solar power unit connected to the modular soil treatment apparatus.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 7 is a front elevational view of the solar power unit with a second solar panel opened;

DETAILED DESCRIPTION OF THE PREFERRED EMBODIMENTS

Figure 1:
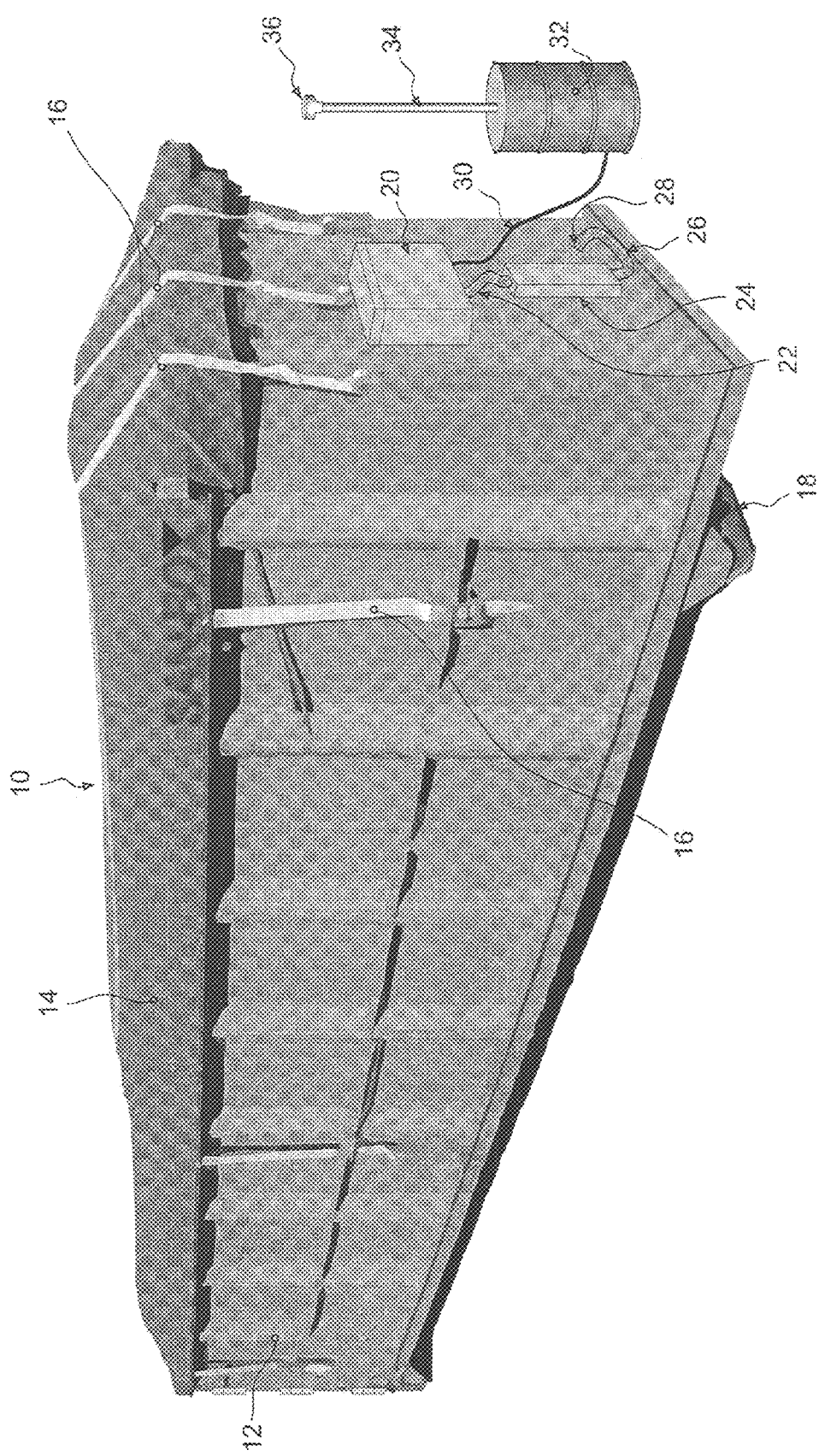
FIG. 1 is a right perspective view of a modular soil treatment apparatus in accordance with one embodiment of the invention.

With reference to FIG. 1, there is shown a mobile soil treatment apparatus 10 consisting of a 30 m³ steel container 12 opened at the top and covered with a tarp 14 secured to the metal container 12 with a series of straps 16. The metal container 12 includes a set of steel wheels 18 and is adapted to be loaded and unloaded from a truck (not shown). On the front of the metal container 12 is mounted a vacuum blower 20 connected via a tube 22 to an integrated air-water separator 24 which is connected via a second tube 26 to an outlet 28 located near the bottom of the metal container 12 in fluid communication with the inside of the metal container 12. The vacuum blower 20 is also connected via a third tube 30 to an air filter (biofilter or carbon filter) 32 in the form of a drum. The air filter 32 includes a venting tube 34 extending upwardly and having a T-shaped exit 36 to prevent precipitations from seeping into the air filter 32.

Figure 2:
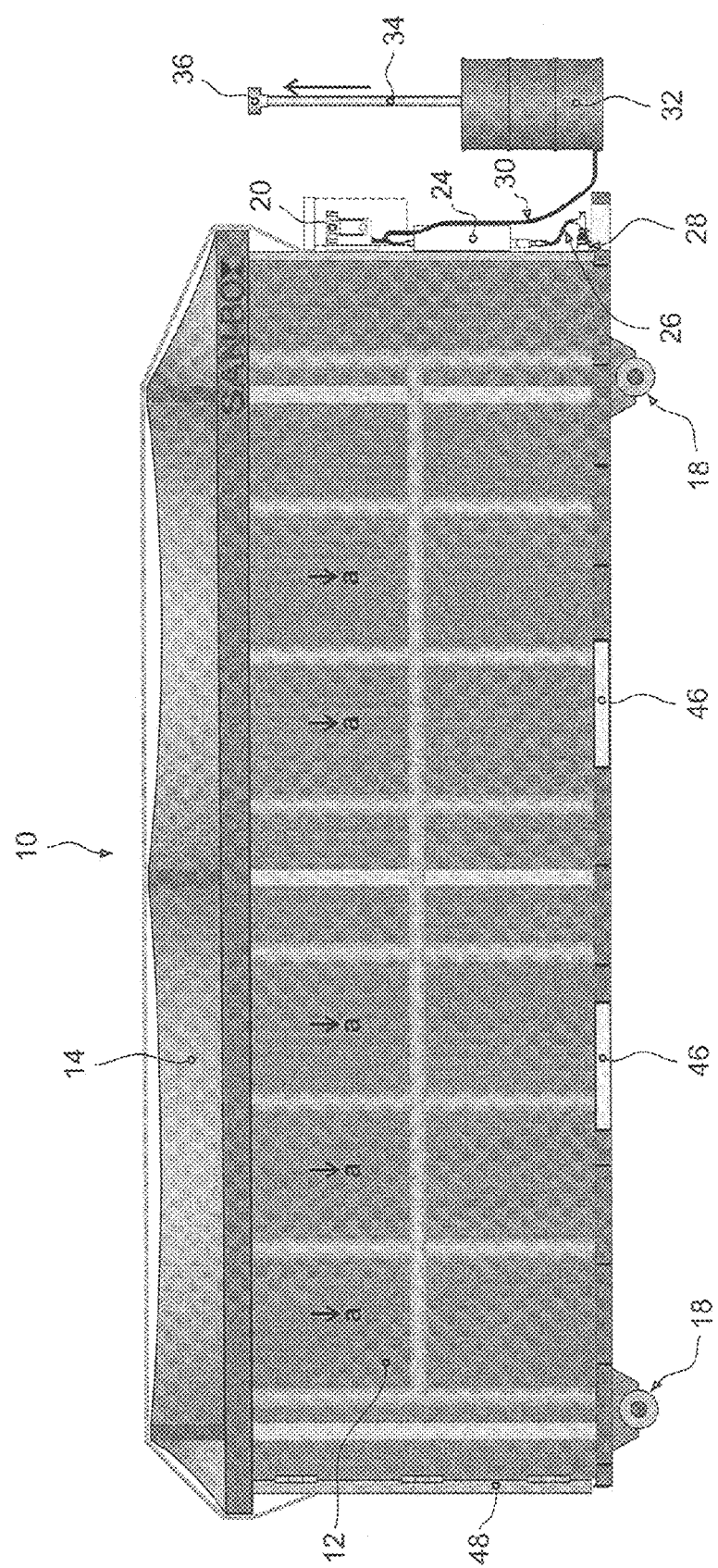
FIG. 2 is a schematic side elevational view of the modular soil treatment apparatus of FIG. 1.

With reference to FIG. 2, in operation, the container 12 is filled with soil contaminated with petroleum hydrocarbons to which has been previously added the required amendments and fertilizer (e.g., manure, compost, sewage sludge, wood chips, peat moss, nitrogen, phosphorus, potassium). When the vacuum blower 20 is activated, air circulates through the contaminated soil from top to bottom as indicated by the arrows 'a', exits through the outlet 28, passes through the air-water separator 24 and is redirected to the air filter 32 which absorbs the lighter and more volatile petroleum constituents' carried by the circulating air and the treated air is released into the atmosphere through the venting tube 34. The covering tarp 14 prevents precipitation water from entering into the container 12 but does not seal the top of the container 12 such that air may enter inside the container 12 and circulate.

Biodegradation of the mid-range hydrocarbon products (e.g., diesel fuel, kerosene) and the heavier (non-volatile) petroleum products (e.g., heating oil, lubricating oils) is accomplished by initially introducing minerals, nutrients, and moisture into the contaminated soil inside the container 12, and periodically mixing the soil, to stimulate aerobic microbial activity within the contaminated soil in combination with the aeration process of the circulating air within the container 12 thereby enhancing microbial activity resulting in the degradation of adsorbed petroleum-product constituents through microbial respiration similar to the standard biopile process.

Figure 3A:
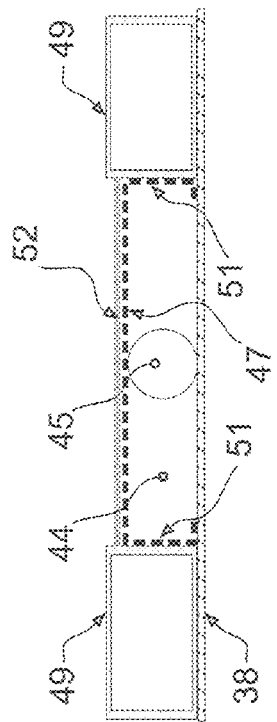
FIG. 3A is cross sectional view of an air circulating section taken at lines 3A-3A of FIG. 3.
Figure 3:
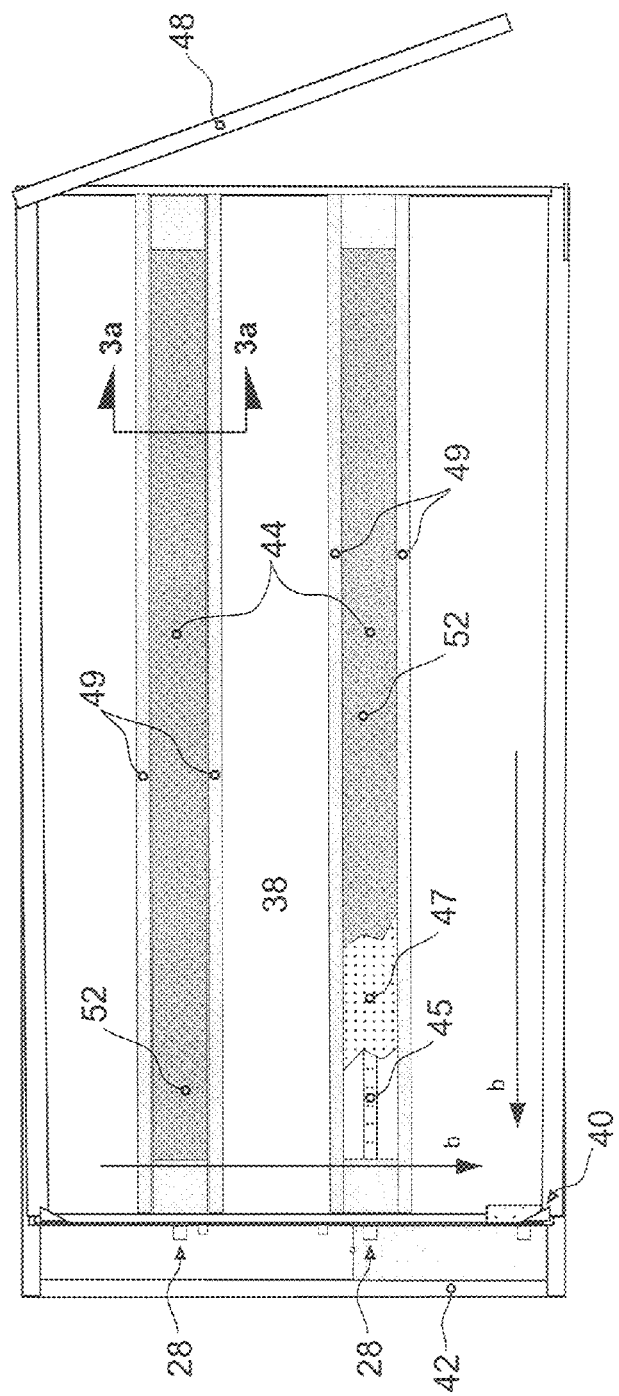
FIG. 3 is a schematic plan view of the interior of the modular soil treatment apparatus of FIG. 1.

With reference to FIG. 3 illustrating the floor 38 or bottom portion of the container 12, the floor 38 is designed to slope towards the outlet 40 as indicated by arrows 'b' in order to drain liquids seeping from the bottom of the contaminated soil which is accumulated in a sealed basin 42. The floor 38 includes a slotted air extraction pipe 45 (one shown) positioned inside each of the two air circulating sections 44 extending the length of the container 12. The air circulating sections 44 are each covered with a perforated steel plate 47 (one shown) to allow air to pass while supporting the contaminated soil and protecting the extraction pipes 45 during soil mixing operations. The circulating sections 44 are connected to outlets 28 connected to the vacuum blower 20.

With reference to FIG. 3A, which is a cross sectional view of the air circulating sections 44, the slotted air extraction pipe 45 is positioned underneath the perforated steel plate 47 which is supported by a pair of legs 51 resting on the floor 38 of the container 12 such that the perforated steel plate 47 is solidly anchored to the floor 38 and provides the required protection for the slotted air extraction pipe 45. The perforated steel plate 47 is overlain by a layer of geotextile 52 which protects the holes of the perforated steel plate 47 from clogging by soil particles. The perforated steel plate 47 is flanked on both sides with steel beams 49 also resting on the floor 38. As illustrated, the steel beams 49 are higher than the perforated steel plate 47 relative to the floor 38 thereby protecting the perforated steel plate 47 from excavator bucket impacts during soil mixing operations as well as when treated soils are removed from the container 12. The air circulating sections 44 which is defined by the inside portion of the perforated steel plate 47 and a portion of the floor 38 of the container 12 as well as the slotted air extraction pipe 45 are therefore protected from impact from the top by the perforated steel plate 47 and from the sides by the steel beams 49.

Referring back to FIG. 2, apertures 46 are positioned at the bottom of the container 12 to allow a fork lift or wheel-loader to lift, move and position the modular soil treatment apparatus 10. The container 12 is also provided with a door 48 to give access to the inside of the container 12 for soil mixing, for emptying the container 12 by tilting the container 12 and discharging the decontaminated soil and for cleaning the container 12 once the decontamination is completed.

The modular soil treatment apparatus 10 can easily be transported and delivered in any location where decontamination of soil is needed via trucks, trains or ships and can be removed from the location when the decontamination is completed. The same modular soil treatment apparatus 10 may be transported into a new location and reused.

The modular soil treatment apparatus 10 is fully functional as a single unit and is simple to operate such that only a short training program is required by a person to operate and monitor the modular soil treatment apparatus 10.

The modular soil treatment apparatus 10 may be filled with contaminated soil in one location and then transported filled with the contaminated soil to another location where the air filter 32 is connected and the decontamination treatment can take place.

The modular soil treatment apparatus 10 could also be used for treating soils contaminated by chlorinated hydrocarbons and volatile organic compounds.

For soils contaminated by chlorinated hydrocarbons, the modular soil treatment apparatus 10 requires no modification but the treatment process does. The treatment process consists in adding to the contaminated soils 1) nitrogen gas to create an anaerobic environment and 2) a reducing agent. No air circulation is carried out during the treatment process. Following a pre-determined treatment period, the vacuum blower 20 is activated to remove the treatment by-products from the soils by filtration through the air filter 32. The treated soils may present a low pH and therefore may require neutralisation by the addition of an alkaline solution.

For soils contaminated by volatile organic compounds (VOCs), the modular soil treatment apparatus 10 is modified by increasing the size and/or number of air filter(s) 32 or by simply changing the air filtering media, inside the air filter 32, more frequently. In this case, the bioventing treatment process combines biodegradation and the physical removal of the VOCs by air circulation or venting. The extracted VOCs are then removed from the air by filtration through the air filter 32. The bioventing treatment process also requires the addition of amendments and fertilizer to the contaminated soils.

The modular soil treatment apparatus 10 and more specifically, the vacuum blower 20 of the modular soil treatment apparatus 10 may be powered by a standard electrical connection to the local electrical power grid if available. However, in remote locations where electrical power grid is not available, the modular soil treatment apparatus 10 may be powered by a gasoline electric generator which must be maintained and refueled periodically.

Figure 4:
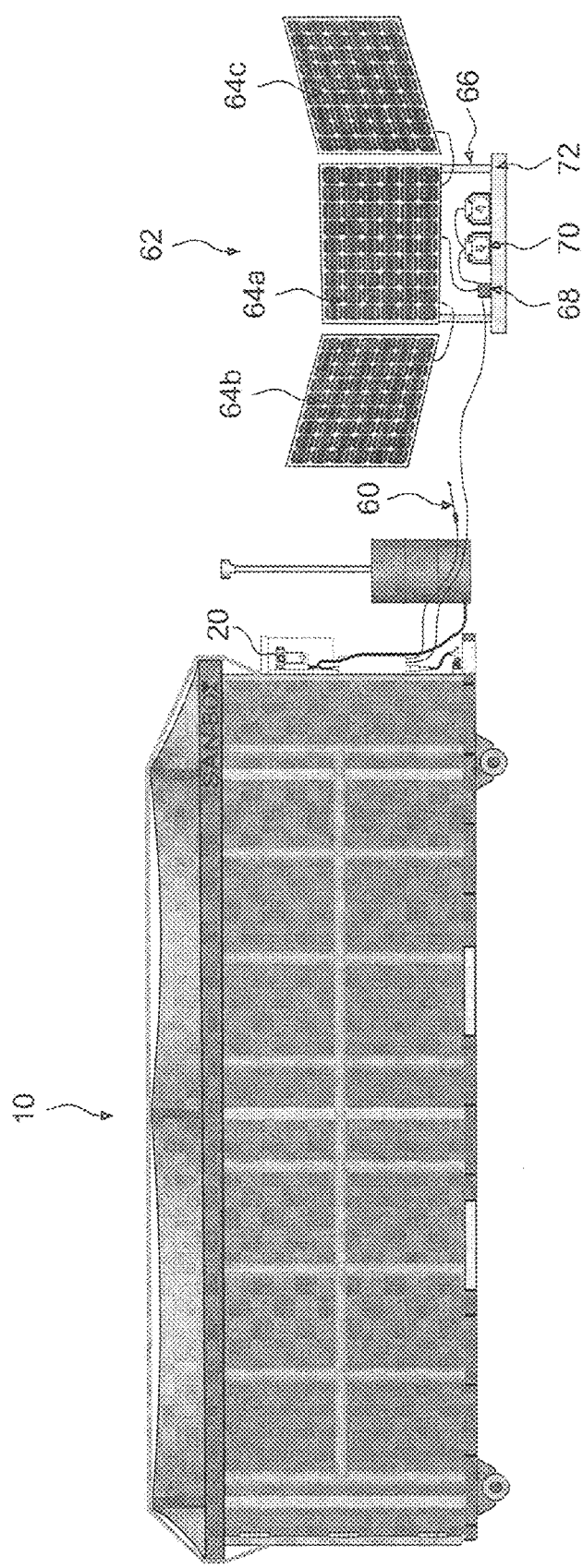
FIG. 4 is a side elevation view of the modular soil treatment apparatus of FIG. 1 connected to a solar power unit.

As illustrated in FIG. 4, the modular soil treatment apparatus 10 is provided with a standard electrical connection 60. However, to make the modular soil treatment apparatus 10 fully autonomous, a solar power unit 62 is provided. The solar power unit 62 comprises three solar panels 64a, 64b and 64c mounted on to a frame 66 and connected to a power converter 68, itself connected to a battery pack 70 and to the vacuum blower 20 of the modular soil treatment apparatus 10. The power converter 68 manages the electrical current produced by the solar panels 64 to charge the battery pack 70 and manages the delivery of electrical current from the battery pack 70 to the vacuum blower 20 of the modular soil treatment apparatus 10. The entire solar power unit 62 including the solar panels 64, the frame 66 and the battery pack 70 are mounted onto a single platform 72 adapted for easy lifting and manipulation by a standard fork lift.

Figure 5B:
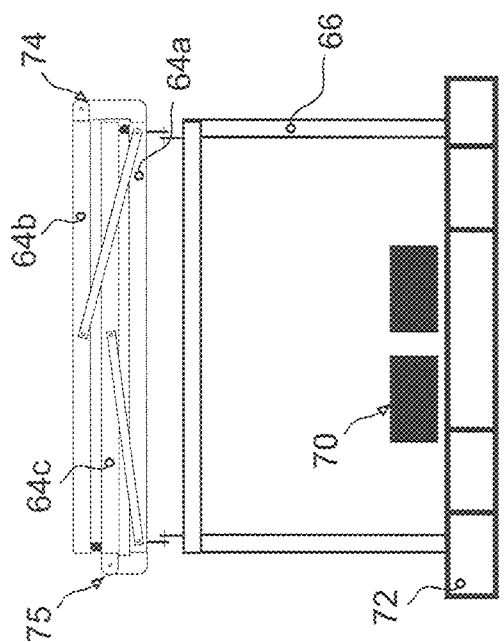
FIG. 5b is a front elevation view of the solar power unit shown in FIG. 4 in a folded position.
Figure 5A:
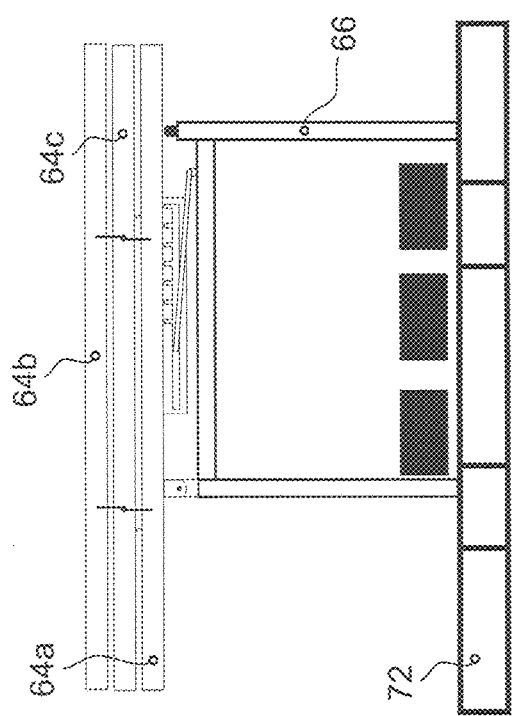
FIG. 5a is a side elevation view of the solar power unit shown in FIG. 4 in a folded position.

With reference to FIGS. 5a and 5b, the solar panels 64b and 64c are mounted onto each side of the central solar panel 64a via hinges 74 and 75 such that they can be folded over the central solar panel 64a and the solar power unit 62 with its solar panels 64b and 64c in their folded position may be transported efficiently. In operation, the solar power unit 62 may be loaded inside the steel container 12 of the modular soil treatment apparatus 10 and the entire system brought to location together or it may be transported to the location separately.

Figure 6:
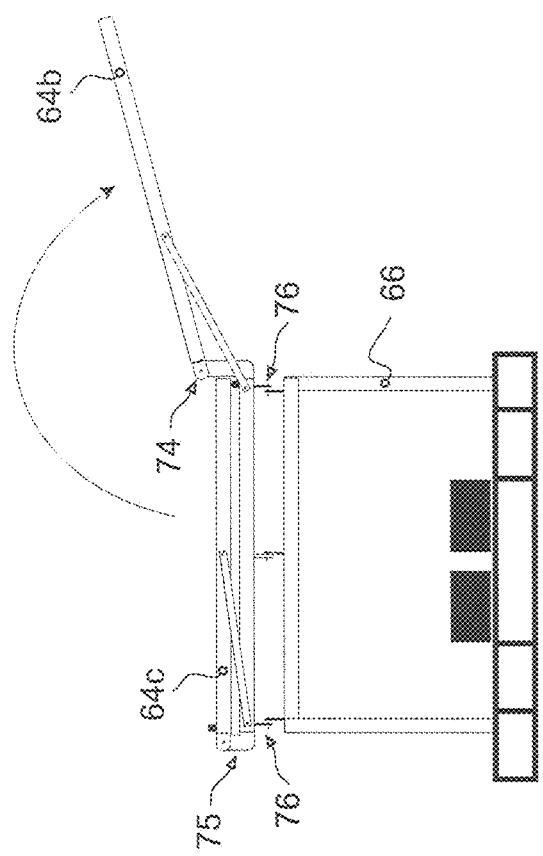
FIG. 6 is a front elevational view of the solar power unit with a first solar panel opened.

With reference to FIGS. 6 and 7, on location, the solar power unit 62 is positioned near the modular soil treatment apparatus 10 and is oriented for maximum exposure to the sun. The solar panels 64b and 64c are deployed by manually opening the solar panel 64b first and then opening the solar panel 64c thereby exposing the central solar panel 64a. As illustrated, solar panels 64b and 64c are hinged onto each side of the central solar panel 64a whereas central solar panel 64a is mounted onto the frame 66 via hinges 76.

Figure 8B:
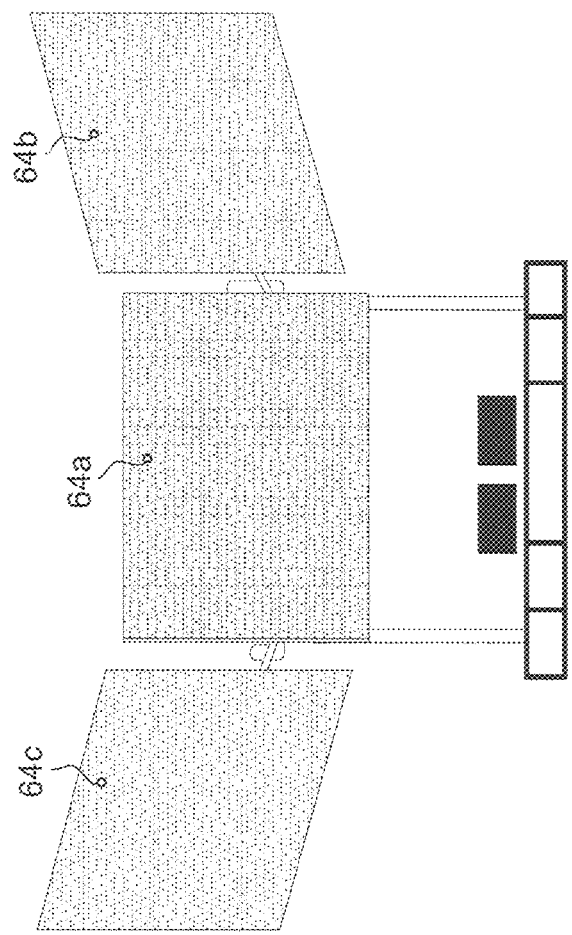
FIG. 8b is a front elevational view of the solar power unit of FIG. 8a in an inclined position.
Figure 8A:
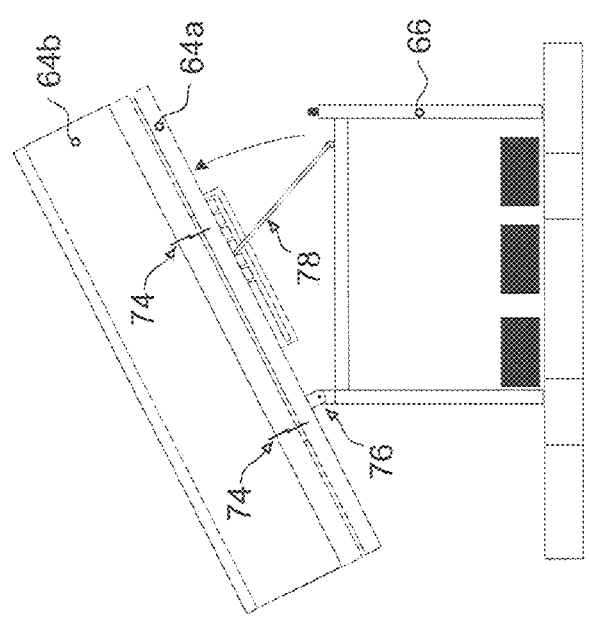
FIG. 8a is a side elevational view of the solar power unit in an inclined position.

With reference to FIGS. 8a and 8b, with the solar panels 64b and 64c fully deployed, the central solar panel 64a is then manually raised by pivoting the central solar panel 64a on its hinges 76 in order to position all solar panels 64a, 64b and 64c in an optimal inclination for maximum exposure to the sun. Once the optimal inclination is established, the central solar panel 64a is locked in the optimal inclined position via locking mechanism 78.

The solar power unit 62 is then connected to the modular soil treatment apparatus 10 when the latter is filled with contaminated soil and ready to begin its operation.

The solar power unit 62 provides an economical, environmentally friendly and autonomous power source for the modular soil treatment apparatus 10 such that the modular soil treatment apparatus 10 can be operated in any location where there is no electrical power grid. Obviously, the solar power unit 62 can be used with the modular soil treatment apparatus 10 even in locations where electrical power is available from a power grid.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A modular soil treatment apparatus comprising:
a steel container having a floor and sides adapted to hold a quantity of contaminated soil;
at least one air circulating section positioned on the floor of the steel container and extending the length of the steel container, the at least one air circulating section including an air extraction pipe positioned underneath a protective perforated steel plate; a steel beam positioned adjacent each side of the protective perforated steel plate wherein the steel beams are positioned at a higher elevation than the protective perforated steel plate relative to the floor of the steel container;
an air-water separator positioned outside the steel container and connected to the air extraction pipe;
a vacuum blower connected to the air-water separator; and
an air filter connected to the vacuum blower.

2. A modular soil treatment apparatus as defined in claim 1, wherein the floor of the steel container slopes towards an outlet for draining liquids seeping from the contaminated soil into a sealed basin connected to the outlet.

3. A modular soil treatment apparatus as defined in claim 1, wherein the steel container is open at the top and is covered with a covering tarp preventing precipitation water from entering into the container.

4. A modular soil treatment apparatus as defined in claim 1, wherein the steel container includes a set of steel wheels and is adapted to be loaded and unloaded from a truck.

5. A modular soil treatment apparatus as defined in claim 1, wherein the steel container includes a door to give access to the inside of the container.

6. A modular soil treatment apparatus as defined in claim 1, further comprising a solar power unit connected to the modular soil treatment apparatus.

7. A modular soil treatment apparatus as defined in claim 6, wherein the solar power unit includes folding solar panels.

8. A modular soil treatment apparatus as defined in claim 7, wherein the solar power unit includes a frame on which the folding solar panels are mounted.

9. A modular soil treatment apparatus as defined in claim 8, wherein the solar power unit is mounted onto a platform adapted for transportation.

10. A modular soil treatment apparatus as defined in claim 7, wherein the solar power unit includes a locking mechanism to adjust the inclination of the solar panels.

\* \* \* \* \*